United States Patent [19]

Hsu

[11] Patent Number: 5,162,706

[45] Date of Patent: Nov. 10, 1992

[54] ANTI-HORIZONTAL-IMPULSE CATHODE-RAY-TUBE DRIVING SYSTEM

[75] Inventor: Sung-Shan Hsu, Chang Hua, Taiwan

[73] Assignee: Tzu-Chiang Wu, Taipei, Taiwan

[21] Appl. No.: 870,301

[22] Filed: Apr. 17, 1992

[51] Int. Cl.$^5$ .............................................. H01J 29/70
[52] U.S. Cl. .................................................... 315/411
[58] Field of Search ................................. 315/411, 408

[56] References Cited

U.S. PATENT DOCUMENTS 4,841,201 6/1989 Takizawa et al. .................. 315/411

Primary Examiner—Theodore M. Blum
Attorney, Agent, or Firm—Jacobson, Price, Holman & Stern

[57] ABSTRACT

The anti-horizontal-impulse cathode-ray-tube driving system comprising an added coil disposed at a location corresponding to the primary coil of the horizontal output transformer thereof, said added coil having one end connected to the output terminal of an anode high voltage generator and an opposite end connected to the anode of the cathode-ray-tube to be driven, and being controlled to produce an induced voltage of reversed phase in countervailing the capacitor formed between the anode and the earthed graphite of the cathode-ray-tube. Under the process of capacitive coupling, the horizontal impulse, which is produced at the anode high voltage, is eliminated from forming an alternating electrical field around the cathode-ray-tube.

1 Claim, 4 Drawing Sheets

ANTI-HORIZONTAL-IMPULSE CATHODE-RAY-TUBE DRIVING SYSTEM

BACKGROUND OF THE INVENTION

The present invention relates to an anti-horizontal-impulse cathode-ray-tube driving system, and more particularly to such a driving system having an additional coil added to the horizontal output transformer of the cathode-ray-tube and controlled to produce an induced voltage, in phase reverse to the upper horizontal impulse of the anode high voltage, connected between the high voltage generator and the anode so as to eliminate the horizontal impulse from the display of the magnetic deflection type of cathode-ray-tube and the radiation of the alternating electrical field derived therefrom.

The known magnetic deflection type cathode-ray-tube driving systems are generally gathered into two types, namely, the compound type and the separated type, as shown in FIGS. 1 and 2, according to whether the high voltage is derived from the horizontal output or from a separate generator. In either type, a horizontal deflection yoke (HDY) (21) is mounted around the neck portion of the cathode-ray-tube (2), and driven by the horizontal output (1) to provide the cathode-ray-tube (2) with a horizontal deflection field. In a compound type cathode-ray-tube driving system, anode high voltage is simultaneously provided by the horizontal output (1). While in a separated type cathode-ray-tube driving system, anode high voltage is provide by a high voltage generator (3). Using a high voltage generator to provide an anode high voltage increases the cost of a cathode-ray-tube driving system, but ensures better quality. FIG. 1 illustrates a compound type cathode-ray-tube driving system according to the prior art, in which the circuit which provides an anode high voltage is incorporated into the circuit of the horizontal output. This design reduces the manufacturing cost of a driving system, however, its wide anode high voltage load regulation affects the stability of the raster produced in conjunction with the horizontal deflection yoke. FIG. 2 illustrates a separated type cathode-ray-tube driving system according to the prior art, in which an independent high voltage generator (3) is provided to produce an anode high voltage. This design ensures a cathode-ray-tube to produce a more stable raster. However, the arrangement of the high voltage generator (3) makes the structure complicated, and simultaneously increases the manufacturing cost of the driving system.

In either of the aforesaid two prior art cathode-ray-tube driving system, an alternating electrical field (AEF) is produced between the anode (22) of the cathode-ray-tube (2) and the earthed external graphite layer (23). As illustrated in FIG. 3, a capacitor Cy is formed between the horizontal deflection yoke (21) and the anode (22), and another capacitor Ct is formed between the graphite layer (23) and the anode (22). The two capacitors Cy,Ct form into a series circuit to bear the voltage Vce at the horizontal deflection yoke (21), as shown in FIG. 4. Therefore, $$Vcy = Vce \cdot \frac{Ct}{Cy + Ct}$$

$$Vct = Vce \cdot \frac{Cy}{Cy + Ct}$$

in which, the voltage Vcy at the capacitor Cy is limited to the area between the horizontal deflection yoke (21) and the anode (22), and hardly affect the physiological functions of the people or the operation of the electric appliances nearby. On the contrary, the voltage Vct at the capacitor Ct is superimposed on the anode high voltage (4), and therefore an impulse (41) is formed, as shown in the dotted lines in FIG. 5. When connected to earth, the impulse forms into an alternating electrical field (AEF) around the cathode-ray-tube. Because the alternating electrical field is radiative, it is harmful to the physiological functions of the people nearby, and interferes with the operation of other electric appliances. Because the phase and cycle of the impulse are approximately equal to the voltage Vce at the horizontal deflection yoke (21), the impulse is called synchronous horizontal impulse or horizontal impulse.

In order to eliminate the aforesaid alternating electrical field, a Farady's shield may be used. Originally, a Farady's shield was made from a metal material and used to isolate the radiation source from the outside. In recent years, plastic materials are used in making a Farady's shield with the inside surface thereof coated with a conductive material. After connected to earth, the outside surface of a Farady's shield forms an earth potential. This method is just to block up a radiation source but not to completely eliminate it. Furthermore, the installation of a Farady's shield complicates the manufacturing process of a cathode-ray-tube driving system, and simultaneously increases its manufacturing cost.

SUMMARY OF THE INVENTION

The present invention has been accomplished to eliminate the aforesaid disadvantages. A driving system according to the present invention includes an added coil in the horizontal output transformer. The anode high voltage, before connecting to the cathode-ray-tube, is connected to the correct end of the added coil. The opposite end of the added coil is connected to the anode of the cathode-ray-tube. Therefore, a voltage which is approximately equal to the voltage of the horizontal impulse and in a reversed phase, is superimposed on the DC output voltage of the anode high voltage so as to cancel or reduce horizontal impulse on the anode high voltage caused by capacitive coupling.

Therefore, the main object of the present invention is to directly incorporate an added coil inside the horizontal output transformer, so as to directly eliminate synchronous horizontal synchronizing impulse or horizontal impulse from the anode high voltage of the cathode-ray-tube. Another object of the present invention is to use an added coil in eliminating horizontal synchronizing impulse or horizontal impulse from a cathode-ray-tube, so as to eliminate the high cost arrangement of a Farady's shield.

DETAILED DESCRIPTION OF THE PREFERRED EMBODIMENT

Figure 8:
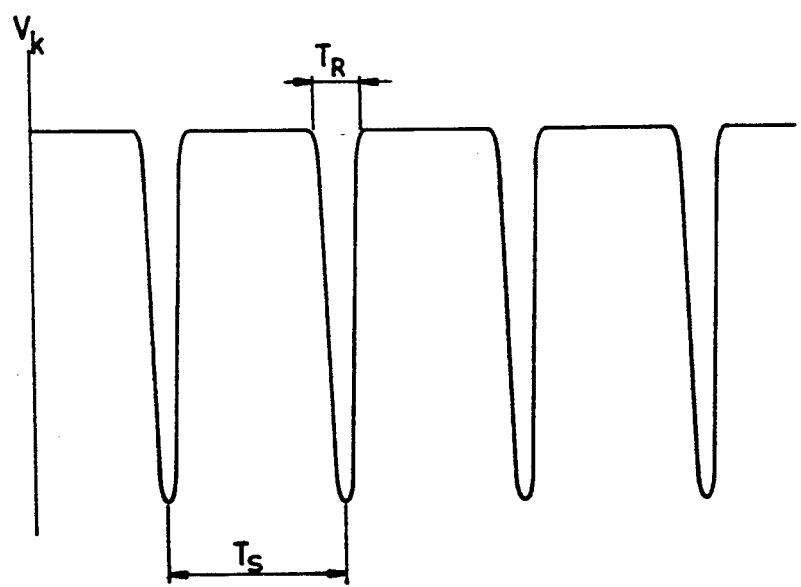
FIG. 8 illustrates the waveform of the induced voltage Vk produced by added coil.
Figure 6:
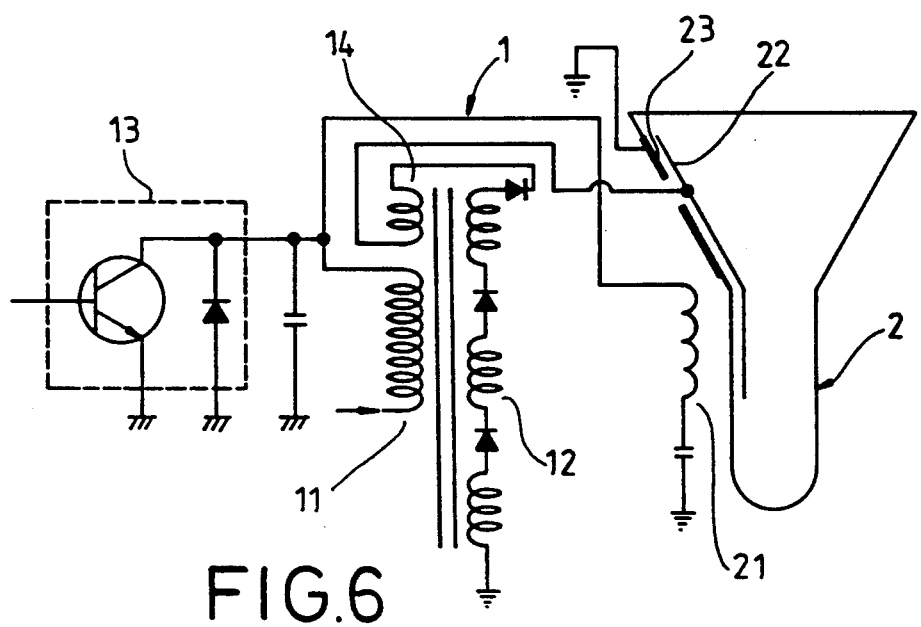
FIG. 6 is a circuit diagram of a compound type cathode-ray-tube driving system according to the present invention.
Figure 7:
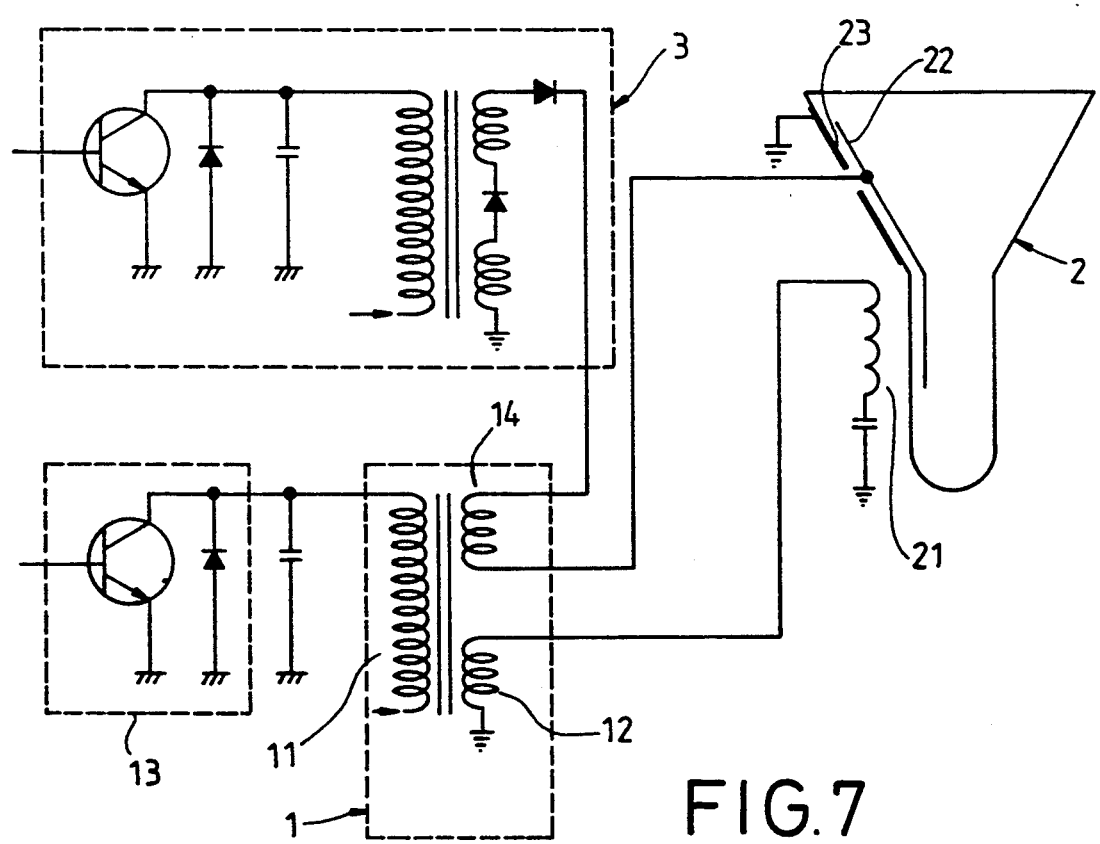
FIG. 7 is a circuit diagram of a separated type cathode-ray-tube driving system according to the present invention.

Referring to FIGS. 6 and 7, the present invention is generally comprised of an electronic switch 13, a resonance capacitor C0, a horizontal output transformer 1, and a cathode-ray-tube (CRT) 2. In a separate type as shown in FIG. 7, a high voltage generator 3 is needed. A graphite layer 23 is covered on the CRT 2 opposed to the anode 22 thereof, and connected to earth. A glass medium is connected between the anode 22 and the graphite layer 23, and therefore a capacitor Ct is formed therebetween. A horizontal deflection yoke (HDY) 21 is mounted around the neck portion of the CRT 2 opposite to the anode 2 and separated by glass medium, and therefore another capacitor Cy is formed between the HDY 21 and the CRT 2. The horizontal output transformer 1 is comprised of a primary coil (PRIM) 11, of which the number of turns is Np, a secondary coil (SEC) 12, of which the number of turns is Ns, and controlled to provide a horizontal deflection power and the required anode high voltage. The resonance capacitor C0 is incorporated with the PRIM 11 and the HDY 21, forming into a resonance circuit for energy feedback during flyback period, and at the same time, impulse voltage Vce is produced in the PRIM 11 and the HDY 21. The electronic switch 12 is regularly controlled to open or close by input signals. The main feature of the present invention is having an added coil 14 set at a location corresponding to the PRIM 11 of the horizontal output transformer 1. The number of turns of the added coil 14 is Nk. The added coil 14 has one end connected to the output terminal of the anode high voltage, and an opposite end connected to the anode 22 of the CRT 2. When the output of the anode high voltage passes through the added coil 14, the added coil 14 produces a pulse Vk superimposed on the anode high voltage with the phase thereof reversed to the horizontal impulse which is coupled from the horizontal deflection yoke (see FIG. 8).

Figure 4:
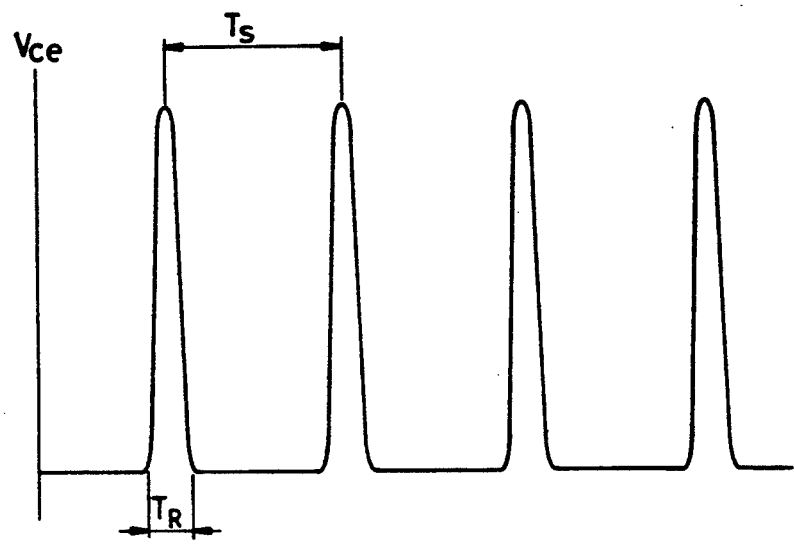
FIG. 4 illustrates the waveform of the impulse voltage Vce at the horizontal deflection yoke in a cathode-ray-tube according to the prior art.

When the electronic switch 13 closed (Ts), The PRIM 11 and the matal shield (HDY) accumulate magnetic energy. Once the electronic switch 12 is opened (Tr), cumulative magnetic energy is turned into electric energy and fedback to power supply or, transmitted to loads via the horizontal output transformer 1. As shown in the circuit diagrams of FIGS. 6 and 7, electric energy is boosted into anode high voltage H. After having been treated through the process of rectification, the anode high voltage thus obtained is sent to the anode 22 of the CRT. At the same time, cumulative magnetic energy from the PRIM 11 and the HDY 21 is turned into electric energy and caused to produce an impulse voltage Vce on the horizontal deflection yoke in cycles according to the time difference between the closing and opening of the electronic switch 13, as the voltage waveform at the location of the horizontal deflection yoke shown in FIG. 4.

Figure 1:
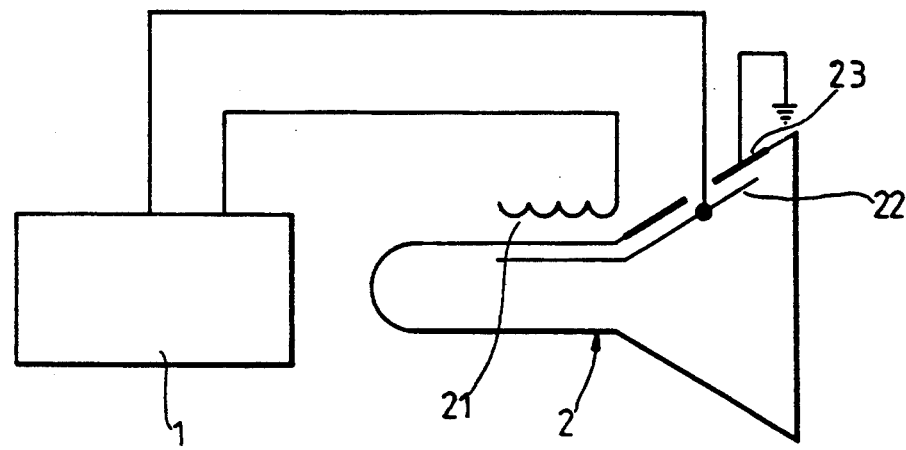
FIG. 1 is a schematic drawing showing the composition of a compound type of cathode-ray-tube driving system according to the prior art.
Figure 2:
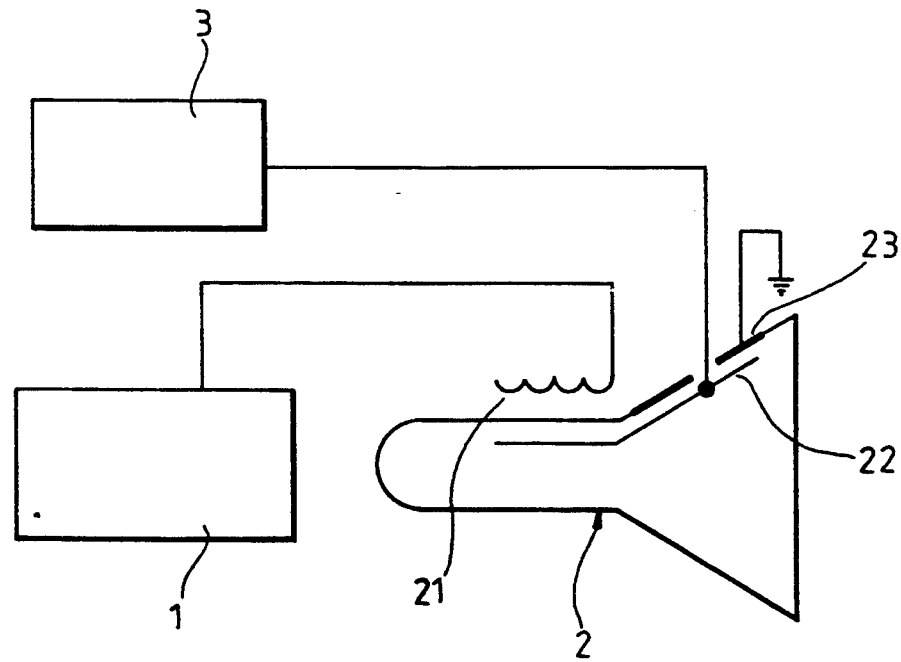
FIG. 2 is a schematic drawing showing the composition of a separated type of cathode-ray-tube driving system according to the prior art.
Figure 3:
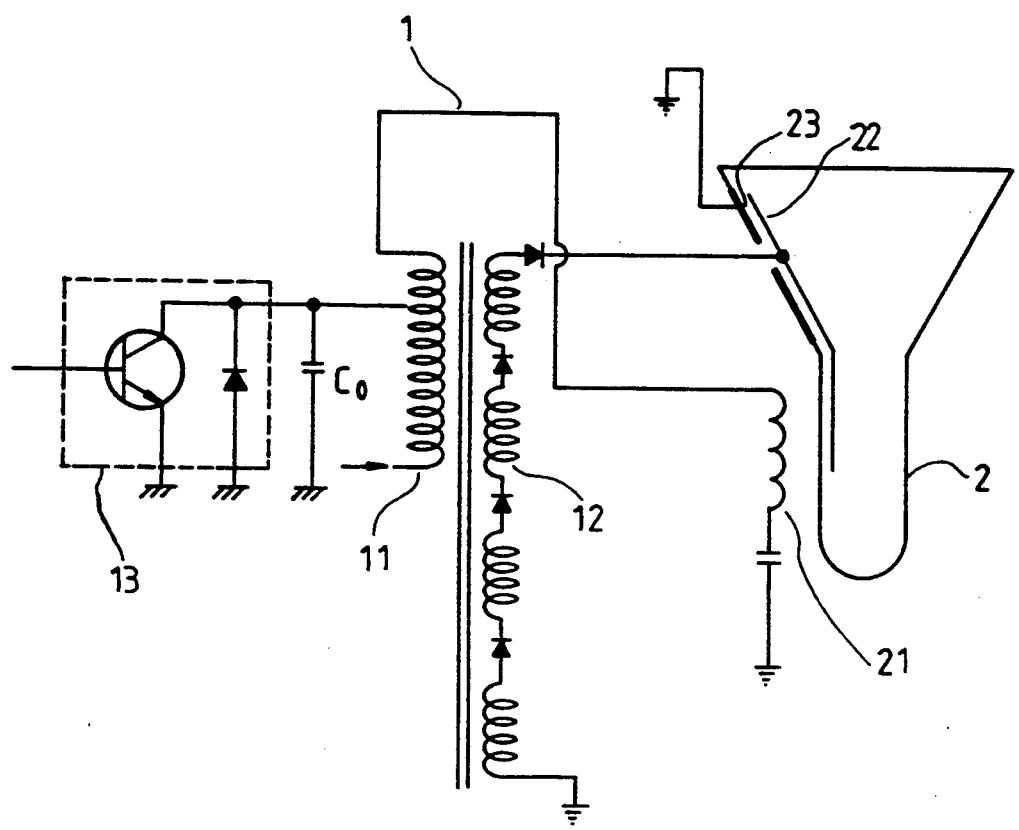
FIG. 3 is a cicuit diagram for the driving system of FIG. 1.
Figure 5:
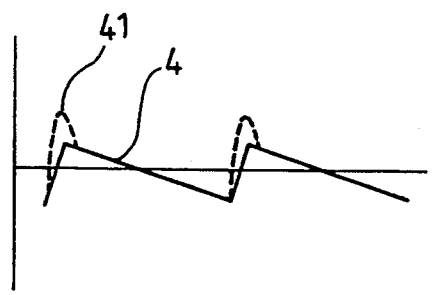
FIG. 5 illustrates the waveform of the horizontal synchronizing impulse superimposed on the anode high voltage in a cathode-ray-tube according to the prior art.

As indicated, the capacitor Ct is formed between the anode 22 of the CRT 2 and the graphite layer 23. After the formation of the voltage Vce, a voltage Vct is formed at the capacitor Ct. The phase and cycle of the voltage Vct are approximately equal to the impulse voltage Vce, and therefore it superimposes on the anode high voltage 4, as shown in FIG. 5, forming into a synchronous horizontal impulse or horizontal impulse 41. After having been connected to earth, the horizontal impulse 41 forms into an alternating electrical field (AEF) around the CRT 2.

In order to effectively eliminate the horizontal impulse and the alternating electrical fiel around the CRT, the present invention adds the added coil 14 (of which the number of turns is Nk) to match with the PRIM 11 (of which the number of turns is Np) of the horizontal output transformer 1, so as to produce an induced voltage Vk in phase reverse to the anode high voltage 4 but cycle same as the anode high voltage 4. Therefore, by superimposing the induced voltage Vk on the anode high voltage 4, the horizontal impulse 41 on the anode high voltage 4, which is produced by the voltage Vct of the capacitor Ct, is almost eliminated. The number of turns Nk of the added coil 14 is calculated according to the following equations:

Firstly, the value of the voltage Vct which produces the horizontal impulse is:

$$Vct = Vce \frac{Cy}{Cy + Ct}$$

Secondarily, the value of the induced voltage Vk produced by the added coil 14 is:

$$Vk = Vp \frac{Nk}{Np}$$

Because the voltage Vct of the horizontal impulse has a reversed phase relative to the induced voltage Vk from the added coil 14, the absolute value of both voltages Vct and Vk should be the same so that they both can cancel each other. Therefore, $$3Vk3 = 3Vct3$$

By expanding the aforesaid equations, the number of turns of the added coil 14 shall be equal to:

$$Nk = Np \frac{Vce}{Vp} \cdot \frac{Cy}{Cy + Ct}$$

Thus, it can almost completely eliminate the horizontal impulse 41 produced on the anode high voltage 4 by the voltage Vct of the capacitor Ct.

What is claimed is:

1. An anti-horizontal- impulse cathode- ray-tube driving system a horizontal output transformer and a cathode-ray-tube, said cathode-ray-tube having a graphite layer covered on the outside at a location corresponding to the anode thereof, and a horizontal deflection yoke mounted around the neck portion thereof, said anode and said graphite layer being connected by a first glass medium, said first glass medium formed into a capacitor Ct, said horizontal deflection yoke being connected to said anode by a second glass medium, said second glass medium formed into a capacitor Cy, said horizontal deflection yoke being to receive a voltage Vce, said horizontal output transformer being consisted of a primary coil and a secondary coil, the number of turns of said primary coil being Np, said primary coil being controlled to produce an induced voltage Vp, and characterized in that an added coil is disposed at a location corresponding to said primary coil of said horizontal output transformer, the number of turns of said added coil being Nk:

$$Nk = Np \frac{Vce}{Vp} \cdot \frac{Cy}{Cy + Ct}$$

said added coil being controlled to produce an induced voltage Vk in phase reverse to the induced voltage at said anode:

$$Vk = Vp \frac{Nk}{Np}$$

equal to the voltage Vct of the horizontal impulse produced at the anode high voltage by the capacitor Ct:

$$Vct = Vce \frac{Cy}{Cy + Ct}$$

so as to eliminate the horizontal impulse which is superimposed on the anode high voltage by the voltage Vct.

* * * * *